United States Patent [19]
Bogartz

[11] Patent Number: 5,501,200
[45] Date of Patent: Mar. 26, 1996

[54] COMPRESSED GAS FUELING SYSTEM

[76] Inventor: Stuart P. Bogartz, 16904 Citronia St., Sepulveda, Calif. 93001

[21] Appl. No.: 267,864

[22] Filed: Jun. 28, 1994

[51] Int. Cl.$^6$ .................................................. F02M 21/04
[52] U.S. Cl. ....................... 123/527; 137/899.4; 137/351
[58] Field of Search ........................... 123/527, DIG. 12, 123/525, 526; 137/12, 351, 899.4

[56] References Cited

U.S. PATENT DOCUMENTS

| | | | |
|---|---|---|---|
| 4,501,253 | 2/1985 | Gerstmann et al. | 123/527 |
| 4,522,159 | 6/1985 | Engel et al. | 123/1 A |
| 4,531,558 | 6/1985 | Engel et al. | 141/44 |
| 4,624,390 | 11/1986 | Palmer et al. | 222/3 |
| 5,107,906 | 4/1992 | Swenson et al. | 141/11 |
| 5,127,230 | 7/1992 | Neeser et al. | 62/7 |
| 5,263,826 | 11/1993 | Baumann et al. | 417/310 |
| 5,315,973 | 5/1994 | Hill et al. | 123/525 |
| 5,351,726 | 10/1994 | Diggins | 123/527 |

*Primary Examiner*—Erick R. Solis
*Attorney, Agent, or Firm*—Eckert Seamans Cherin & Mellott

[57] ABSTRACT

A fueling system for a vehicle equipped with an engine fueled by compressed gas and a storage system for storing the gas under pressure and providing the gas to the engine, includes a compressor on board the vehicle for receiving gas at a first pressure through an inlet and outputting the gas a second pressure higher than the first pressure through an outlet, an electric motor connectable to an electric power source outside the vehicle for powering the compressor, a low-pressure connection for removably connecting the inlet to a source of low-pressure gas at the first pressure, and a high-pressure connection between the outlet and the fuel storage system. The compressor preferably compresses in two to four stages. The fueling system permits an operator to recharge the fuel cylinders of a gas-powered vehicle from a source of low pressure gas, such as a metered residential gas line, using standard AC line power and simple gas fittings.

14 Claims, 3 Drawing Sheets

COMPRESSED GAS FUELING SYSTEM

BACKGROUND OF THE INVENTION

1. Field of the Invention

The invention relates to fueling systems for vehicles, and, in particular, to a compressed gas vehicle fueling system installed in the vehicle, including electric power and low pressure gas connection means for coupling to electric and gas terminals outside the vehicle, enabling storage of a gaseous fuel supply on board the vehicle. The fueling system includes, in a compressed gas powered vehicle, a gas compressor operable to fill a pressurized gas storage system in the vehicle and an inlet that connects with a valved low-pressure gas line. The compressor is preferably a multi-stage compressor, with at least two, and preferably four stages, powered by standard domestic ac electrical power and in conjunction with the gas storage system can load sufficient fuel from a low pressure domestic natural gas line to power an automobile or similar vehicle over a typical operating range as needed to travel between locations at which natural gas supplies are conveniently available.

2. Prior Art

Gasoline and diesel fuels are relatively dirty in that they contain a substantial proportion of complex hydrocarbons as compared to other combustible fuels, as well as gum forming compounds that can clog fuel systems, and hydrogen sulfide and thiols (mercaptans) that are offensive to humans and corrosive to engine parts. Burning such fuels in an internal combustion engine or the like typically cracks hydrocarbon compounds in the fuel without completely oxidizing them. The result is various forms of encapsulating hydrocarbons, soot and the like, which together with other compounds are emitted in the exhaust, build up on engine pans, or otherwise contribute to the pollution of the environment. Petroleum is also an increasingly scarce resource.

By comparison, natural gas is a highly desirable fuel, especially based upon its performance for internal combustion piston engines. It is generally more available than petroleum fuels, and is widely distributed to stationary domestic installations as a preferred source of energy for appliances, heaters and the like. On the basis of cost per joule of heat energy, natural gas may be the least expensive fuel available in a given area.

Natural gas performs well in piston engines. Its high antiknock qualities permit design of highly efficient, high compression engines. The dry, sulfur-free form readily available from pipelines is an extremely clean fuel that burns cleanly in engines, producing minimal engine deposits and little or no corrosion of engine pans. However, because natural gas is a gaseous fuel it cannot be stored in conventional liquid fuel tanks. Thus its use as engine fuel is generally in connection with stationary installations, such as engines that power heavy duty compressors or drive generators in central power stations.

It has been attempted to use natural gas as a vehicle fuel, storing a quantity of gas at high pressure on board the vehicle. A substantial quantity of gas is needed to operate over a reasonable range between fillings. Vehicles powered by compressed natural gas require a storage system for the gas under pressure, such as a gas cylinder array. The gas is typically stored in a multi-cylinder array at a pressure of about 3000–3200 psi when fully charged, providing a typical operating range of about 100 miles or more, after which the cylinder array needs to be recharged. This range is adequate for many people, but requires that the storage system be refilled more frequently than a typical gasoline vehicle, for example on a daily basis.

To recharge the cylinder array, the vehicle is brought to a fueling station that can charge a cylinder array at high pressure in 5 to 15 minutes. Any more than 30 minutes is generally considered impractical. Fleet operators have invested in facilities for high-pressure charging of natural gas cylinders at their base of operations, such that each vehicle in a fleet (e.g., of taxicabs or delivery trucks) can be filled each day. A facility of this type may require a high volume and/or high pressure hookup to a gas pipeline, and means to pump the gas at sufficient pressure and capacity to serve the fleet.

The number of existing natural gas filling stations is limited. This is due not only to the limitation on the number of natural gas vehicles in existence, but also to the relatively large investment in a facility capable of extracting an adequate volume of gas from a pipeline or other source, pressurizing the gas and delivering it to meet reasonable time and quantity expectations. Facilities capable of high pressure storage and delivery, such as those used by commercial fleet operators, may be highly regulated or even prohibited by local zoning or building codes. They can be dangerous to operate and expensive to install.

On the other hand, natural gas is currently available at millions of residential and commercial sites to which it is generally delivered by underground pipes for powering heating and cooking appliances and the like. This gas is delivered at very low pressure, capable of delivering adequate energy for appliances. The typical input gas pressure is a minimum of six inches water column. The maximum pressure is 5 psig. A standard flow rate is 1.5 SCFM (at 100° F. ambient). The delivery technique is generally considered safe, even though leaks result in fires or explosions occasionally. It is possible to equip a residence or the like with pressurized storage tanks and means to compress natural gas from the pipeline for storage in the tanks. However, it would not be safe to provide such equipment in residences, effectively attempting to provide a plurality of small scale filling stations, each capable of compressing, storing and delivering natural gas for filling vehicle tanks on demand.

Thus, notwithstanding its favorable combustion characteristics, natural gas remains an inconvenient fuel for typical consumers and operators of individual vehicles. The danger, expense and inconvenience associated with fueling facilities has severely inhibited the development and use of compressed natural gas as a vehicle fuel. There is a need for a more convenient system for charging storage cylinders in vehicles powered by natural gas, that takes advantage of the availability of the fuel to individual vehicle operators, but is not characterized by the danger and inconvenience of high pressure storage and delivery facilities.

SUMMARY OF THE INVENTION

It is an object of the invention to provide a safe and efficient on board fueling system for compressed gas powered vehicles that is selectively coupleable to low pressure gas supplies and therefore permits a vehicle to be filled from domestic gas lines and the like.

It is another object of the invention to provide a fueling system for compressed gas powered vehicles with a high output-pressure compressor, powered from domestic electric power mains, for example at 110 or 220 VAC.

It is another object of the invention to provide a fueling system for compressed gas powered vehicles that is mounted in and transportable with the vehicle.

It is another object of the invention to provide a fueling system for compressed gas powered vehicles that is generally compatible and safe for residential use by unsophisticated consumers.

These and other needs are met according to the invention in an on-board fueling system for compressed gas powered vehicles. As used herein, the term "gas" shall include any combustible compressible gaseous fuel that is useful as a sole fuel or one of a plurality of selectable fuels for an engine to power a vehicle. The term thus includes, for example, natural gas, methane, propane, butane, ethane, hydrogen and other gaseous fuels presently known or hereafter discovered or produced synthetically. The system includes, in a vehicle powered by an engine fueled with compressed gas and having one or more compressed gas storage cylinders, a compressor mounted in or on the vehicle, having an outlet connected to the cylinder and an inlet that selectively connects to a valved source of low-pressure gas located off the vehicle, such as a quick connect coupling to a low pressure gas line as commonly provided in residential and commercial buildings. The compressor, which is preferably a two-stage Department of Transportation certified compressor, includes an electric motor having means for connecting to line voltage located off the vehicle, also by quick connect couplings, preferably at domestic mains voltage, e.g., 110 or 220 VAC. The line voltage can be provided by a grounded outlet, and can be shielded by a barrier from the gas coupling, spaced from the gas coupling and/or provided with control interlocks to prevent exposure of gas to potential arcs.

The fuel compressor can connect to the valved source of low-pressure gas with a quick connect fitting either of both ends of an inlet line such as a length of low-pressure flexible hose. The inlet line of the compressor can include a manual valve, a filter, and a methane detector that controls a safety shut-off valve. An optional accumulator tank in the inlet line can provide protection for a meter in the source line from damage or wear due to pressure/vacuum fluctuations that may occur, for example, when starting or stopping operation of the compressor. A first pressure sensitive switch permits operation of the compressor only when the pressure in the accumulator is above a predetermined minimum pressure, preferably about 1.5 psi.

The outlet side of the compressor preferably is securely connected to a fuel cylinder array in the vehicle by a high-pressure gas outlet line. A check valve in the outlet line resists back-flow into the compressor from the fuel cylinders. A second pressure sensitive switch in the outlet line automatically shuts off the compressor when the pressure in the cylinders reaches a predetermined pressure, typically about 3000–3200 psi. The second pressure sensitive switch can also be configured to control a valve to close the connection between the compressor and the cylinders when the compressor is turned off. The outlet line can advantageously include a valved high-pressure connector as an alternative input for fueling the cylinder array from a source of high-pressure gas, should such a source be available to the user, for quick fueling.

The fueling system is applicable to vehicles powered solely by natural gas, and to vehicles that are alternatively powered from gas or another fuel, such as liquid petroleum fuel, battery power, etc. Accordingly, suitable valves and switching means can be provided to enable switching from one mode of operation to another on demand.

These and other objects of the invention will be more fully understood from the following detailed description, with reference to exemplary embodiments as illustrated in the drawings appended hereto.

DETAILED DESCRIPTION OF THE PREFERRED EMBODIMENTS

The fueling system of the invention permits the operator of a vehicle powered by compressed gas to charge the fuel cylinders in the vehicle from a source of low pressure gas conveniently and safely. Very many homes and businesses presently are equipped, for example via buried pipelines, with metered supplies of natural gas, safely regulated at low pressure and mixed with trace elements to provide a distinct smell in the event of a leak. The supply pressure is generally quite low, e.g., several PSIG, and according to the invention, this gas supply is tapped and pressurized by a compressor for filling vehicle fuel tanks over a period of time, e.g., overnight. The compressor likewise is powered from domestic electric power mains, at 220 or preferably 110 VAC, which is also available at most homes and businesses.

The fueling system of the invention is mounted in and transportable by the gas powered vehicle. The fueling system is conveniently connectable to the low pressure natural gas supply line and to the AC power mains by quick connections enabling the consumer to arrive home at the end of the day, couple the fueling system to the gas and power supplies, and return in the morning to a full tank.

Figure 1:
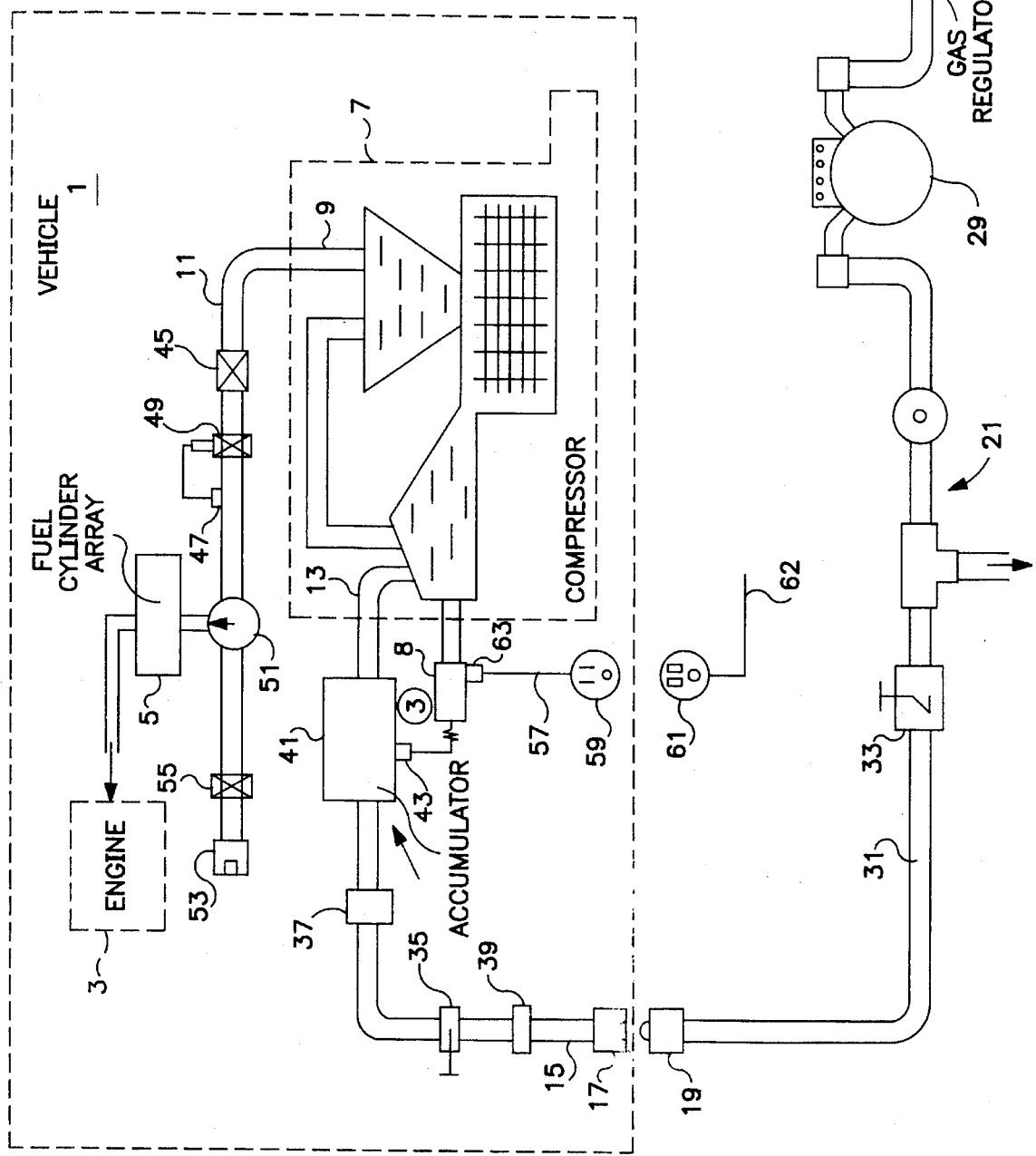
FIG. 1 is a piping diagram, and partly an electrical diagram, of a preferred embodiment of the fueling system of the present invention.

In the embodiment shown in FIG. 1, a vehicle 1 having a natural gas fueled engine 3 that includes the fueling system of the invention is equipped with a fuel cylinder array 5 for storing natural gas at high pressure, typically at a maximum pressure of about 3000 to 3200 PSI. A two to four-stage fuel compressor 7 is powered by an electric motor 8. Fuel compressor 7 is preferably one certified for vehicle use by the U.S. Department of Transportation. Fuel compressor 7 has an outlet 9 connected to the fuel cylinder array 5 by a high-pressure gas line 11. The inlet 13 of the fuel compressor 7 preferably is connected to a flexible, low-pressure gas inlet line 15 having a quick disconnect gas fitting 17 at its other end. The quick disconnect fitting 17 permits removable connection to a mating quick disconnect fitting 19 provided on a natural gas supply line 21 at a fixed location servicing the garage of a residential or commercial building. The quick connect fitting can be a bayonet-type fitting coupleable to a resiliently biased receptacle opening, or a threaded fitting can be provided. Whereas the pressure of the gas in this area is low, supply line 21 can be a relatively light weight tubing.

Another variation in design would include a flexible low pressure gas line embodying a coaxial electrical conductors to transmit any static electricity. In addition a combination fuel source and electric power means provides a single source of fuel and operative electricity in a novel safety feature involving the connector or connectors.

The natural gas supply line 21 generally includes a main shut-off valve 23 between the utility supply connection 25 and a gas regulator 27. Downstream from the regulator 27 is a gas meter 29. A side line 31 from the building service that can be closed by a manual valve 33. In addition a safety solenoid valve 46 (see FIGS. 2 and 3) is to be installed after manual valve 33 and before the quick disconnect fitting to shut off the gas in the event of an inadvertent breakaway of the connection. The line terminates in the mating quick disconnect fitting 19.

The low-pressure inlet line 15 to the inlet 13 of the fuel compressor 7 preferably includes a manual shut-off valve 35, a filter 37, and a methane detector 39 that includes switching means to turn off compressor 7 when a predetermined concentration of methane is detected in the ambient air outside the fueling system, suggesting a potential leak. Downstream from the filter 37 an accumulator tank 41 includes a first pressure sensitive switch 43 that permits operation of the electric motor 8 when the gas pressure within the accumulator 41 is at least about a minimum pressure, preferably at least about 1.5 psi above ambient atmospheric pressure. If the pressure in the accumulator 41 is less than the minimum pressure, then the first pressure sensitive switch 43 will prevent operation of the motor 8, thereby stopping the compressor 7.

The high-pressure outlet line 11 connecting the outlet 9 of the compressor 7 and the fuel cylinder array 5 preferably includes a check valve 45 restricting backflow of gas into the compressor 7, and a second pressure sensitive switch 47 downstream of the check valve 45 for shutting off the compressor motor 8 when the cylinder array 5 is pressurized to a predetermined maximum pressure, such as at least about 3000 PSI. The second pressure sensitive switch 47 can also control an automated valve, e.g., an additional solenoid actuated valve 49, when the pressure in the cylinder array 5 exceeds the maximum pressure.

The outlet line and the compressor are permanently mounted in the vehicle. Accordingly, these elements and their connections can be made very durable, for example using appropriately thick walled conduit means and the like. In addition, for safety reasons in the event of a vehicle collision, these parts can be armored appropriately by protective cage structures and the like. Whereas the compressor, high pressure lines and storage tanks are thus fixedly mounted and protected, the overall fueling system is more safe, for example, than a storage and high pressure output filling station that might be installed in a consumer's home.

The outlet line 11 also preferably includes a pressure indicator, such as pressure gauge 51, for monitoring the pressure in the cylinder array 5, functioning substantially as a fuel gauge. A high pressure quick disconnect fitting 53 located downstream from the check valve 45 permits the vehicle 1 to be quickly fueled at a conventional high pressure fueling station (not shown). Manual valve 55 closes off fitting 53 when not in use. Electric motor 8 is powered by ac line voltage, preferably single phase, 110 VAC. Power cord 57 terminates in a male electrical connector or plug 59, which is removably connectable to a female electrical outlet or socket 61, which is connected to utility-supplied conductors 62 or the like.

Figure 2:
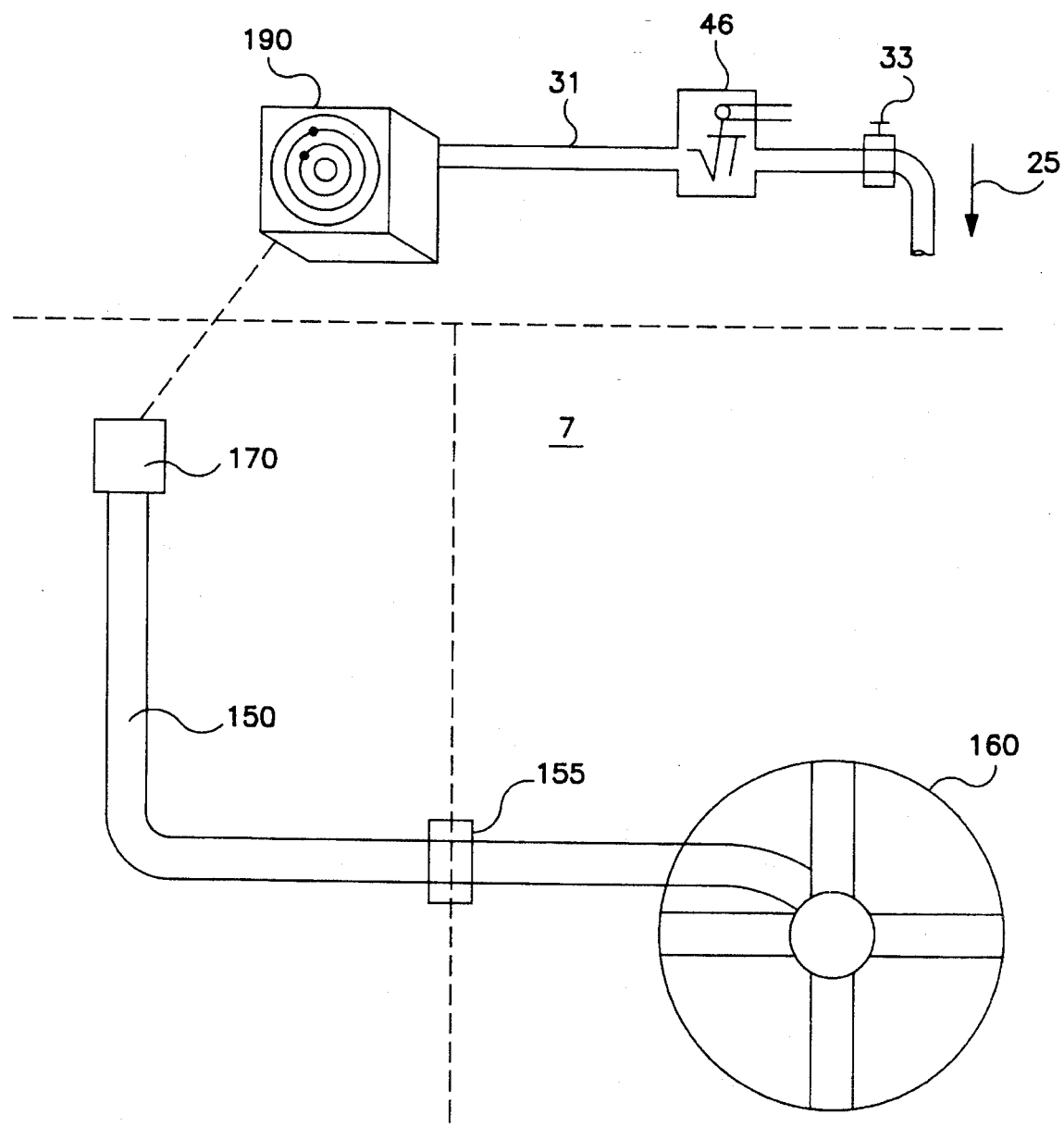
FIG. 2 is an enlarged detail of the diagram of FIG. 1, showing alternative quick-disconnect fittings according to the invention, which alternative fittings combine a gas-conduit connection with an electrical-conductor connection; and, FIG. 3 is an electrical diagram of FIG. 2.
Figure 3:
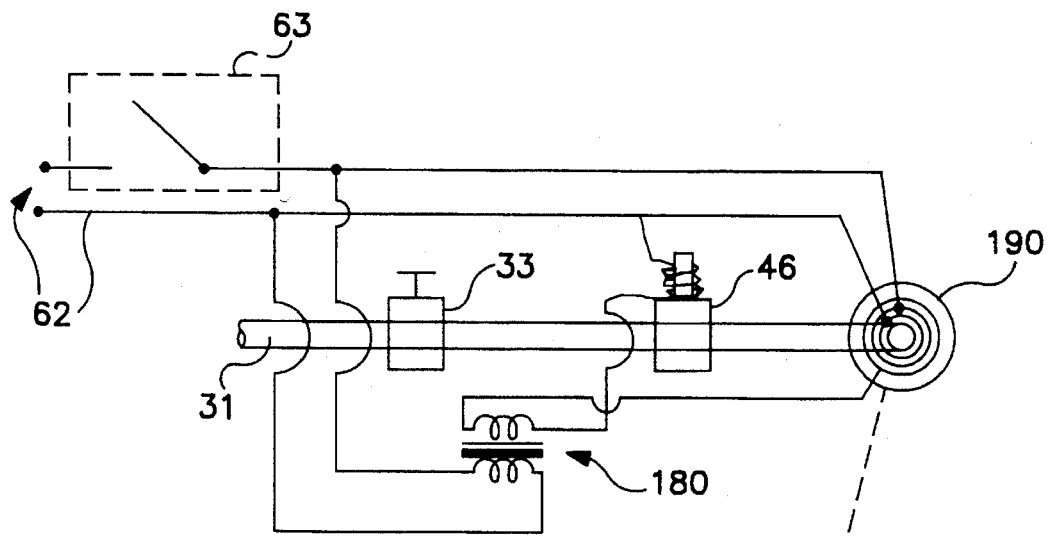
Figure 3:
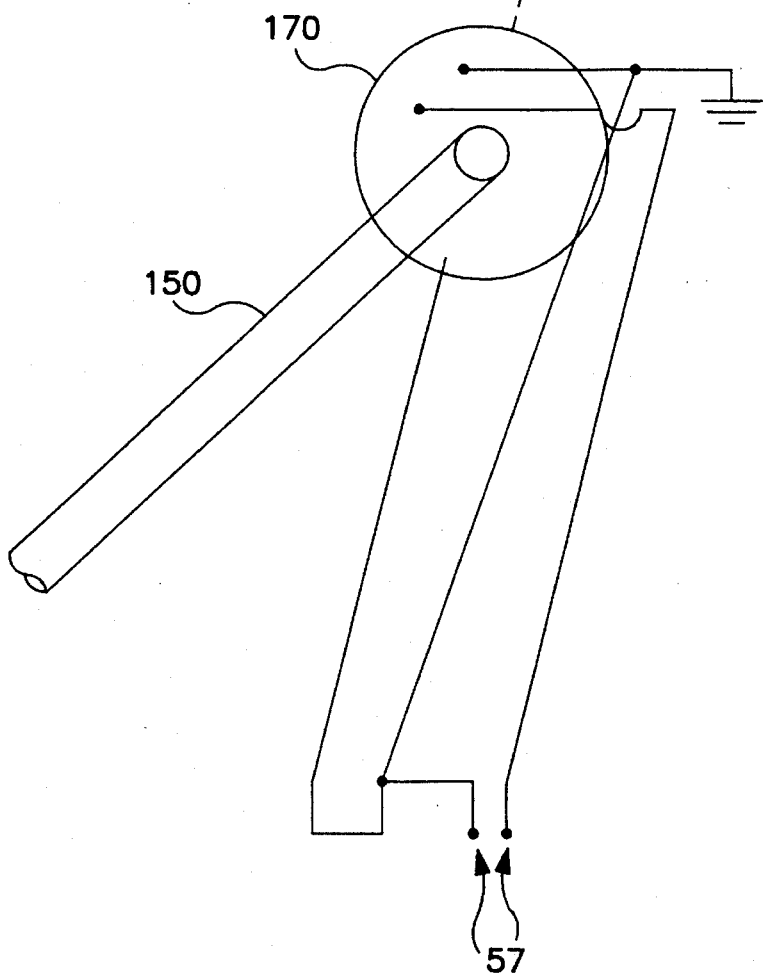

FIGS. 2 and 3 show an alternative manner of carrying the gas flow and electric power in combination. The quick disconnect fittings 17 and 19 in FIG. 1 are replaced by the fittings 170 and 190 in FIGS. 2 and 3. These fittings 170 and 190 are replacements for the electrical plug and socket 59 and 61 respectively (FIG. 1), and additionally combine gas conduits 150 and 31 respectively with electrical conductors 57 and 62. The conductors 57 and 62 in FIGS. 2 and 3 cooperatively supply electric current for power and/or signalling.

With general reference to FIGS. 2 and 3, the coaxial gas/electrical line 150 is flexible and is carried in coils on a reel 160 which is spring-biased for reeling back-in reeled-out lengths of the flexible line 150. The reel 160 is mounted inside the vehicle 7 such as inside the trunk or fender of the vehicle 7. The flexible line 150 extends through an opening in the fender (not shown) through a sleeve 155. Flexible line 150 terminates in the coaxial quick disconnect fitting 170, which is cooperatively matable with the coaxial quick disconnect fitting 190, for releasable connections therebetween permitting simultaneous communication of both flowing gas and electric power.

The coaxial fitting 190 is connected via an ordinary piping connection (not shown) to the side line 31 (which is supplied natural gas from the utility supply connection located in the direction of arrow 25). The side line 31 extends through the manual shut off valve 33 and the solenoid valve 46, which solenoid valve 46 operates on line voltages in the range of 6–24 volts, as supplied through a transformer 180. The solenoid valve 46 includes a safety feature such that if the solenoid circuit is disconnected or broken due to a disconnect or break-in (or other like events isolating the solenoid valve 46 from power), the valve 46 is normally biased to a closed position in which the flow of gas is normally shut off. In FIG. 3, the coaxial fittings 170 and 190 are shown in such a diagram that illustrates the gas conduits 150 and 31 as occupying the central axis the fittings 170 and 190, while the electrical conductors 57 and 62 occupy positions axially spaced from the central axis thereof.

In use, the system on/off switch 63 (FIG. 3) switches electric power to the motor 8, pressure sensitive switches 43 and 47, and solenoid actuated valve 49. The power to each of the aforesaid powered components is preferably regulated and protected by, for example fuses or breakers, by means well known in the art. Furthermore, safety and operational interlocks can be associated with the system as a whole, e.g., to prevent operation of the compressor unless the gas line is connected and pressurized, to prevent operation of the vehicle unless the fueling system is decoupled from the gas and/or power fittings, to isolate various portions of the system in the event of a detected leak, etc. Similarly, such conditions can be announced using appropriate alarms or indicators (not shown).

The fueling system of the invention is extremely simple in operation. An operator parks vehicle 1 near quick disconnect fitting 19 on natural gas supply side line 31 and near electric outlet 61. The fueling system, which advantageously is located in the trunk or a trunk compartment of vehicle 1 nearby fuel cylinder array 5, is accessed by opening the trunk lid. External hookups can also be provided. Quick disconnect fitting 17 on low pressure gas inlet line 15 is connected to quick disconnect fitting 19, and electric power plug 59 is connected to electric outlet 61. Manual valve 33 on side line 31 and manual valve 35 on inlet line 15 are then opened. System on/off switch 63 (FIG. 3) is turned on, and compressor 7 begins operating when the pressure in accumulator 41 reaches the predetermined minimum pressure. Natural gas entering inlet 13 of fuel compressor 7 at minimal pressure is pressurized by compressor 7 and output through high pressure outlet line 11 to fuel cylinder array 5. Second pressure sensitive switch 47 shuts off motor 8, and thereby compressor 7, when fuel cylinder array 5 is pressurized to the maximum pressure.

The time required to fill cylinder array 5 depends upon the initial pressure of the line, the total volume of the cylinders, the predetermined maximum pressure and the capacity of the compressor. However, the charging operation can typically be completed in 8 to 12 hours, or overnight, using a conventional two-to-four stage compressor similar to those used to fill scuba tanks and the like.

Quick charging of cylinder array 5 is also very simple. The operator positions the vehicle 1 at a high pressure filling station (not shown), connects fitting 53 to a mating fitting at the station, closes valve 45, opens valve 55, and begins filling cylinder array 5 from the station in a manner consistent with standard practice. This procedure typically takes about 5 to 15 minutes.

Thus, the fueling system of the invention allows overnight fueling of a vehicle fueled by compressed gas at a home or a business location, or alternatively, quick filling at a gas company facility.

Because the fuel compressor is vehicle mounted and suitably protected against collision damage, the vehicle fueling system is relatively more safe than a home installation, and remains a low pressure arrangement which has no storage requirement. Only a small plumbing addition to gas supply line 21 (side line 31 and valve 33) and provision of an additional 110 VAC outlet 61 are required at the fueling site.

Whereas particular embodiments of the present invention have been described above as examples, it will be appreciated that variations of the details may be made without departing from the invention. Therefore, reference should be made to the appended claims rather than to the foregoing discussion of preferred examples, in order to assess the scope of the invention in which exclusive rights are claimed.

I claim:

1. A fueling system for a vehicle equipped with an engine fueled by a compressible gas and gas storage means for providing the compressed gas to the engine and for storing the gas under pressure, comprising:

compressor means mounted in and transportable on board the vehicle for receiving gas at a first pressure through an inlet and outputting the gas through an outlet at a second pressure higher than the first pressure;

an electric motor for powering the compressor means, including electric input means for selectively coupling the electric motor to a source of electric power outside the vehicle;

inlet connector means for removably connecting the inlet to a source of low-pressure gas located outside the vehicle; and, outlet connector means for providing a high-pressure connection between the outlet and the gas storage means;

wherein the inlet connector means includes an accumulator and first pressure switch means responsive to pressure within the accumulator for permitting operation of the compressor when the pressure in the accumulator is at least about a predetermined minimum pressure and for prohibiting operation of the compressor when the pressure within the accumulator is less than about the minimum pressure.

2. The fueling system of claim 1, wherein the compressor means is a two-to-four stage gas compressor.

3. The fueling system of claim 1, wherein the inlet connector means includes a quick-disconnect fitting for connecting to a mating quick-disconnect fitting at an outlet of the source of low-pressure gas.

4. The fueling system of claim 1, wherein the inlet connector means includes at least one of a manual shut-off valve and an automatic shut-off valve.

5. The fueling system of claim 1, wherein the inlet connector means includes a parallel gas conduit and electrical conductors, and further comprising an automatic solenoid valve operable to close the inlet connector in an event of interruption of connection of the inlet connector means.

6. The fueling system of claim 1, wherein the outlet connector means includes a high-pressure gas line having a check valve restricting a flow of gas from the gas storage means to the outlet of the compressor.

7. The fueling system of claim 1, wherein the outlet connector means includes second pressure switch means responsive to the second pressure for turning the compressor off when the second pressure reaches a predetermined maximum pressure.

8. The fueling system of claim 7, wherein the outlet connector means includes high-pressure means downstream of the check valve for removably connecting the gas storage means to a source of pressurized gas.

9. A fueling system for a vehicle equipped with an engine fueled by compressed gas and gas storage means for providing the compressed gas to the engine and for storing the gas under pressure, comprising:

a two-to-four stage compressor on board the vehicle for receiving gas at a first pressure through an inlet and outputting the gas through an outlet at a second pressure higher than the first pressure;

an electric motor for providing power to the compressor, including electric connector means for connecting the motor to ac line voltage located outside the vehicle;

an inlet line for removably connecting the inlet to a source of low-pressure gas outside the vehicle for providing gas at the first pressure, wherein the inlet line includes a quick-disconnect fitting for connecting to a mating quick-disconnect fitting at an outlet of the source of low-pressure gas, a shut-off valve, an accumulator and first pressure switch means for permitting operation of the compressor when the pressure in the accumulator is at least about a minimum pressure and for prohibiting operation of the compressor when the pressure in the accumulator is less than about the minimum pressure; and an outlet line for providing a high-pressure connection between the outlet and the gas storage means, including a check valve restricting a flow of gas from the gas storage means to the outlet, and second pressure switch means responsive to the second pressure in the outlet line for turning the compressor off when the second pressure reaches a predetermined maximum pressure.

10. The fueling system of claim 9, wherein the outlet connector means includes high-pressure means downstream of the check valve for removably connecting the gas storage means to a source of pressurized gas.

11. The fueling system of claim 9, wherein the inlet line includes a flexible, low-pressure hose.

12. A method of fueling a vehicle equipped with an engine fueled by compressed gas and fuel storage means for storing the gas under pressure and for providing the gas to the engine, comprising the steps of:

providing, on board the vehicle, a fueling system that includes a gas compressor, an electric motor for powering the compressor, electric connector means for removably connecting the motor to a source of electric power off the vehicle, low-pressure connector means for removably connecting an inlet of the compressor to a source of low-pressure gas outside the vehicle and a high-pressure gas line between an outlet of the compressor and the fuel storage means;

connecting the inlet of the compressor to the source of low-pressure gas with the low-pressure connector means;

providing gas at a first pressure to the inlet of the compressor;

connecting the motor to the source of electric power with the electric connector means;

providing electric power to the motor;

powering the compressor with the motor;

compressing the gas entering the inlet with the compressor; and outputting the gas through the high-pressure gas line at a second pressure greater than the first pressure, whereby the fuel storage means is filled with gas at the second pressure;

wherein the step of providing gas at the first pressure to the inlet includes the step of accumulating gas in an accumulator upstream from the inlet.

13. The method of claim 12, comprising the step of stopping the motor when the second pressure reaches a predetermined maximum pressure.

14. The method of claim 12, comprising the step of disconnecting the motor from the source of electric power and disconnecting the inlet from the source of low-pressure gas after stopping the motor.

* * * * *